United States Patent
Maeda

[11] Patent Number: 5,093,749
[45] Date of Patent: Mar. 3, 1992

[54] DIFFRACTION GRATING HAVING INCIDENT AND EMITTING SIDE GRATINGS

[75] Inventor: Hideo Maeda, Tokyo, Japan
[73] Assignee: Ricoh Company, Ltd., Tokyo, Japan
[21] Appl. No.: 639,092
[22] Filed: Jan. 9, 1991
[30] Foreign Application Priority Data
Jan. 18, 1990 [JP] Japan .................................. 2-9113
[51] Int. Cl.$^5$ .............................................. G02B 5/18
[52] U.S. Cl. ..................................... 359/571; 359/575
[58] Field of Search ............... 359/558, 569, 571, 574, 359/575, 576

[56] References Cited
U.S. PATENT DOCUMENTS

| | | | |
|---|---|---|---|
| 4,011,009 | 3/1977 | Lama et al. | 350/162.22 |
| 4,708,436 | 11/1987 | Kleinknecht | 350/162.17 |
| 4,850,682 | 7/1989 | Gerritsen | 350/348 |
| 4,938,553 | 7/1990 | Maerz et al. | 350/96.11 |
| 5,029,154 | 7/1991 | Sumi et al. | 369/112 |

Primary Examiner—Frank Gonzalez
Attorney, Agent, or Firm—Oblon, Spivak, McClelland, Maier & Neustadt

[57] ABSTRACT

A diffraction grating has incident and emitting side gratings respectively formed on front and rear faces of a diffraction substrate composed of a transparent plane-parallel plate. A pitch $\Lambda_1$ of the incident side grating, a pitch $\Lambda_2$ of the emitting side grating, a refractive index $n_1$ of the diffraction substrate, a thickness t of the diffraction substrate, and incident angle $\theta_1$ of light incident to the incident side grating, an angle $\theta_2$ of diffraction within the diffraction substrate, an emission angle $\theta_3$ of light emitted from the emitting side grating, a distance T from the emitting side grating to a face for receiving the emitted and diffracted light, and a wavelength $\lambda$ of the light are set to satisfy the following conditions.

$$\frac{t}{n_1 \Lambda_1 \cos^3 \theta_2} - \frac{T}{\frac{\Lambda_1 \Lambda_2}{\Lambda_2 - \Lambda_1} \cos^3 \theta_3} < 20 \ \mu\text{m/nm}$$

$$\sin \theta_1 + n_1 \sin \theta_2 = \frac{\lambda}{\Lambda_1}$$

and $$\sin \theta_1 - \sin \theta_3 = \lambda \left( \frac{1}{\Lambda_1} - \frac{1}{\Lambda_2} \right)$$

3 Claims, 2 Drawing Sheets

DIFFRACTION GRATING HAVING INCIDENT AND EMITTING SIDE GRATINGS

BACKGROUND OF THE INVENTION

1. Field of the Invention

The present invention relates to a diffraction grating used in various kinds of optical devices such as an optical pickup, a spectroscope, a demultiplexer, etc.

2. Description of the Related Art

A diffraction grating is one of general and important optical elements. Such a diffraction grating is described in e.g., "8.6. Fraunhofer's diffraction in an optical instrument" in a diffraction theory in chapter VIII of "Principle II of optics" written by M. Born and E. Wolf (a 15th edition translated by Tohru Kusagawa and Hidetsugu Yokota published from Tokai University Press in May, 1975. The diffraction grating is an element for dividing light having non-single wavelengths every a single wavelength.

In such a diffraction grating, when an incident angle of light incident to the diffraction grating is set to $\theta_i$, an angle $\theta_o$ of diffraction, a wavelength $\lambda$ of the light and a grating pitch is set to $\Lambda$, a phase matching condition is generally provided as follows.

$$\sin \theta_i - \sin \theta_o = m\lambda/\Lambda \quad (m=0, \pm 1, \pm 2, \ldots) \quad (1)$$

A change in angle of the light caused by a change in wavelength is called angular dispersion. From the above formula (1), this angular dispersion is represented by the following formula (2).

$$d\theta/d\lambda = m/\Lambda \cos \theta \quad (2)$$

In accordance with this formula (2), the angular dispersion is inversely proportional to the grating pitch $\Lambda$. Therefore, to reduce the angular dispersion, it is necessary to increase the grating pitch.

However, when the grating pitch is increased in low angular dispersion, diffraction efficiency is reduced. Namely, to operate the diffraction grating of this kind with high efficiency, it is necessary to cause Bragg diffraction by reducing the grating pitch to a length about the wavelength of light. Therefore, at the present time, it is difficult to consist the low angular dispersion and the high diffraction efficiency with each other so that such a diffraction grating is practically used only in a limited range.

SUMMARY OF THE INVENTION

It is therefore an object of the present invention to provide a diffraction grating for consisting low angular dispersion and high diffraction efficiency with each other.

The above object of the present invention can be achieved by a diffraction grating comprising incident and emitting side gratings respectively formed on front and rear faces of a diffraction substrate composed of a transparent plane-parallel plate; and a pitch $\Lambda_1$ of the incident side grating, a pitch $\Lambda_2$ of the emitting side grating, a refractive index $n_1$ of the diffraction substrate, a thickness $t$ of the diffraction substrate, an incident angle $\theta_1$ of light incident to the incident side grating, an angle $\theta_2$ of diffraction within the diffraction substrate, an emission angle $\theta_3$ of light emitted from the emitting side grating, a distance $T$ from the emitting side grating to a face for receiving the emitted and diffracted light, and a wavelength $\lambda$ of the light being set to satisfy the following conditions.

$$\left| \frac{t}{n_1 \Lambda_1 \cos^3 \theta_2} - \frac{T}{\frac{\Lambda_1 \Lambda_2}{\Lambda_2 - \Lambda_1} \cos^3 \theta_3} \right| < 20 \ \mu m/nm$$

$$\sin \theta_1 + n_1 \sin \theta_2 = \frac{\lambda}{\Lambda_1}$$

and $$\sin \theta_1 - \sin \theta_3 = \lambda \left( \frac{1}{\Lambda_1} - \frac{1}{\Lambda_2} \right)$$

In the double diffraction grating structure having the above two gratings respectively formed on front and rear faces of a transparent plane-parallel plate, angular dispersion with respect to wavelength is reduced when the parameters such as the grating pitches, etc. satisfy the above conditions. Accordingly, it is possible to consist high diffraction efficiency and low angular dispersion with each other. Therefore, for example, the moving amount of a light spot on the light-receiving face with respect to the change in wavelength is reduced so that the diffraction grating can be used without any problem even when there is a problem about an increase in angle of diffraction.

Further objects and advantages of the present invention will be apparent from the following description of the preferred embodiments of the present invention as illustrated in the accompanying drawings.

DESCRIPTION OF THE PREFERRED EMBODIMENTS

The preferred embodiment of a diffraction grating in the present invention will next be described in detail with reference to the accompanying drawings.

Figure 1:
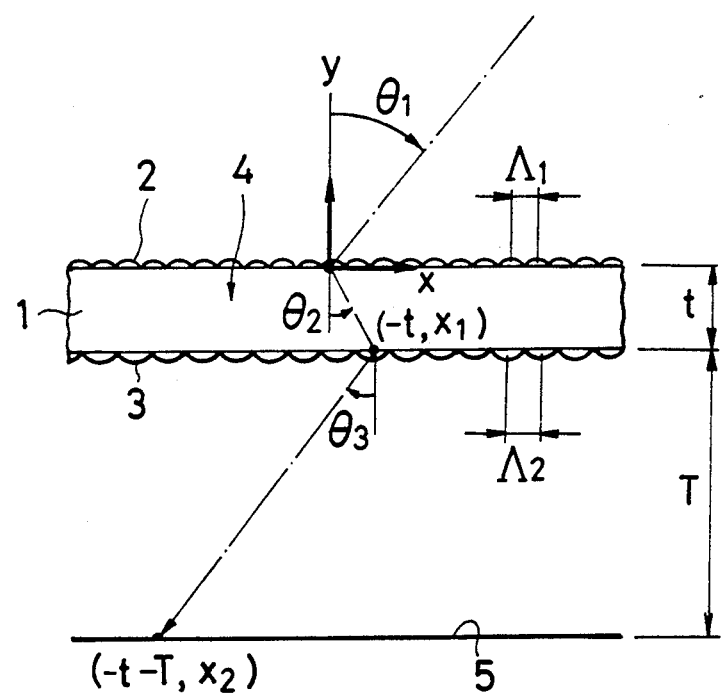
FIG. 1 is a schematic front view of a diffraction grating in one embodiment of the present invention.

In a diffraction grating in one embodiment of the present invention shown in FIG. 1, an incident side grating 2 on an incident side of light is formed on a front face of a diffraction substrate 1 composed of a transparent plane-parallel plate. An emitting side grating 3 on a light-emitting side is formed on a rear face of the diffraction substrate 1. Accordingly, the diffraction grating in the present invention constitutes a double diffraction grating 4 of a transmission type. In such a diffraction grating 4, x and y coordinates are set as shown in FIG. 1. Namely, an incident position of the light on a face of the incident side grating 2 is set to an origin of the x and y coordinates. In the following description, a pitch of the incident side grating 2 is set to $\Lambda_1$. A pitch of the emitting side grating 3 is set to $\Lambda_2$. A refractive index of the diffraction substrate 1 is set to $n_1$. A thickness of the diffraction substrate 1 is set to $t$. An incident angle of the light incident to the incident side grating 2 is set to $\theta_1$. An angle of diffraction within the diffraction substrate 1 is set to $\theta_2$. An emission angle of light emitted from the emitting side grating 3 is set to $\theta_3$. A distance from the emitting side grating 3 to a light-receiving face 5 for receiving the emitted and diffracted light is set to T. A wavelength of the light is set to λ.

In this case, after light is incident to the origin and is diffracted therefrom, an x-coordinate ($x_1$) of the diffracted light reaching the emitting side grating 3 is represented as follows.

$$x_1 = t \cdot \tan \theta_2 \tag{3}$$

In this case, the thicknesses of materials constituting the gratings 2 and 3 are neglected. After the diffracted light is diffracted by this emitting side grating 3, an x-coordinate ($x_2$) of the diffracted light reaching the light-receiving face 5 is represented as follows.

$$x_2 = x_1 - T \cdot \tan \theta_3 \tag{4}$$

The relation between the incident angle $\theta_1$ and the diffraction angle $\theta_2$ within the diffraction substrate 1 is represented as follows.

$$\sin \theta_1 + n_1 \sin \theta_2 = \lambda / \Lambda_1 \tag{5}$$

The relation between the incident angle $\theta_1$ with respect to the diffraction grating 4 and the emission angle $\theta_3$ with respect to the emitting side grating 3 is represented as follows.

$$\sin \theta_1 - \sin \theta_3 = \lambda(1/\Lambda_1 - 1/\Lambda_2) \tag{6}$$

The coordinate ($x_2$) is calculated from the above formulas (3) and (4) and is provided as follows.

$$x_2 = t \cdot \tan \theta_2 - T \cdot \tan \theta_3 \tag{7}$$

This coordinate ($x_2$) is differentiated with respect to the wavelength λ and is provided as follows.

$$\frac{dx_2}{d\lambda} = \frac{t}{\cos^2 \theta_2} \cdot \frac{d\theta_2}{d\lambda} - \frac{T}{\cos^2 \theta_3} \cdot \frac{d\theta_3}{d\lambda} \tag{8}$$

Further, the formula (5) is differentiated with respect to the wavelength λ so that the following formula (9) is obtained.

$$\frac{d\theta_2}{d\lambda} = \frac{1}{n_1 \Lambda_1 \cos^2 \theta_2} \tag{9}$$

Similarly, the formula (6) is differentiated with respect to the wavelength λ so that the following formula (10) is obtained.

$$\frac{d\theta_3}{d\lambda} = \frac{1}{\frac{\Lambda_1 \Lambda_2}{\Lambda_2 - \Lambda_1 \cos^3 \theta_3}} \tag{10}$$

When these formulas (9) and (10) are substituted into the formula (8), the following formula (11) is obtained.

$$\frac{dx_2}{d\lambda} = \frac{t}{n_1 \Lambda_1 \cos^3 \theta_2} - \frac{T}{\frac{\Lambda_1 \Lambda_2}{\Lambda_2 - \Lambda_1 \cos^3 \theta_3}} \tag{11}$$

In accordance with this formula (11), it is possible to calculate a moving amount $dx_2/d\lambda$ of a diffracted light spot on the light-receiving face 5 with respect to the change in wavelength.

The moving amount of the diffracted light spot reaching the light-receiving face 5 is inversely proportional to resolution of the diffraction grating. In the case of the double diffraction grating 4, it is possible to suitably change the moving amount $dx_2/d\lambda$ by changing the grating pitches $\Lambda_1$, $\Lambda_2$, the thickness t of the diffraction substrate, the distance T from the emitting side grating 3 to the light-receiving face 5, and the refractive index $n_1$ of the substrate. In particular, in a system for receiving the diffracted light irrespective of the change in wavelength, it is important to dispose the double diffraction grating 4 and it is desirable to set the moving amount of the light spot to be less than 20 μm when the wavelength is changed by 1 nm.

Accordingly, it is sufficient to set the moving amount $dx_2/d\lambda$ to satisfy the following condition (12).

$$\frac{dx_2}{d\lambda} < 20 \; [\mu m/nm] \tag{12}$$

This condition (12) is easily realized by suitably setting the respective parameters with respect to the double diffraction grating 4 and the distance T from the emitting side grating 3 to the light-receiving face 5.

Figure 2:
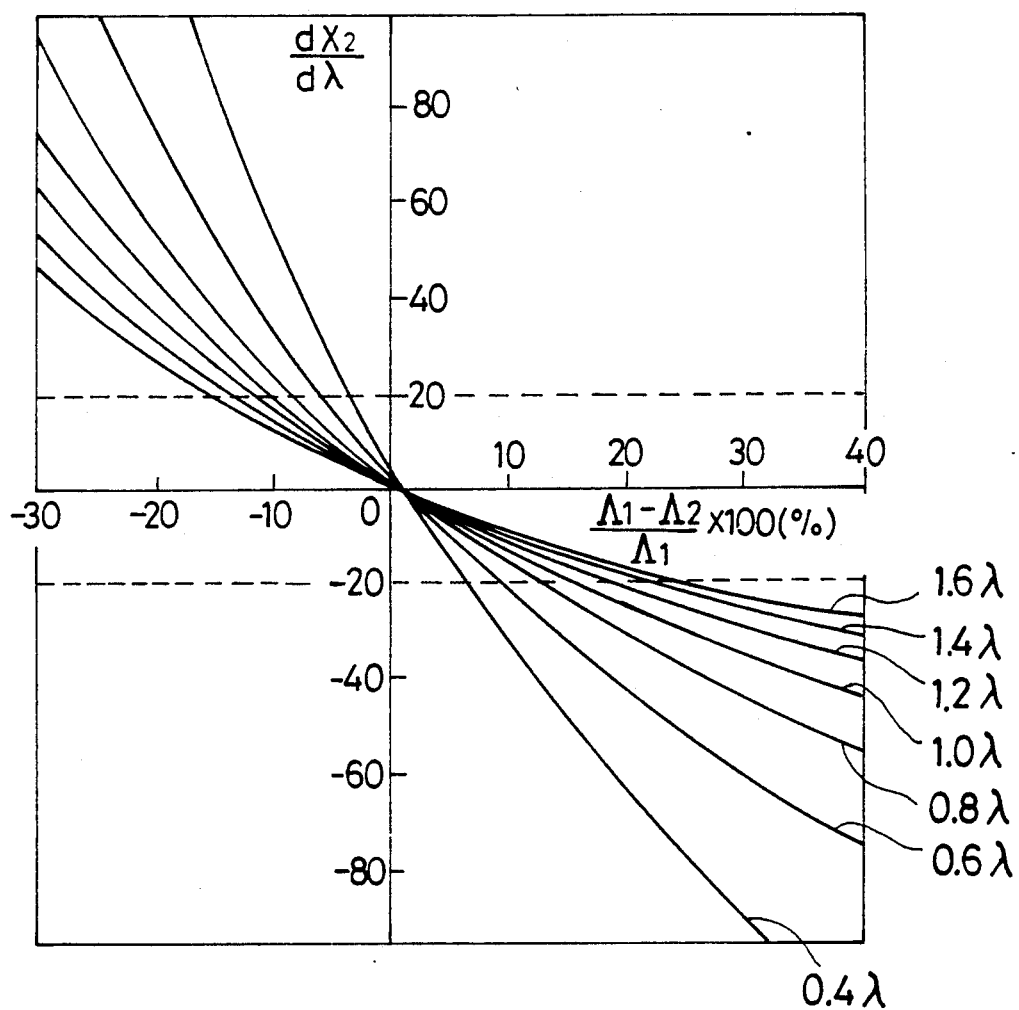
FIG. 2 is a characteristic graph showing calculated examples of a moving amount of diffracted light on a light-receiving face with respect to the change in wavelength.

FIG. 2 shows calculated examples of the moving amount of the diffracted light with respect to the change in wavelength. In FIG. 2, the difference between the grating pitches $\Lambda_1$ and $\Lambda_2$ is normalized by the grating pitch $\Lambda_1$ on the axis of abscissa and the moving amount $dx_2/d\lambda$ is shown on the axis of ordinate. In FIG. 2, dotted lines show cases in which $dx_2/d\lambda = \pm 20$ [μm/nm] when the thickness t is 2 mm and the distance T is 50 mm. It is sufficient to determine values of the grating pitches $\Lambda_1$ and $\Lambda_2$ within a range set between these dotted lines.

As mentioned above, the diffraction grating in the present invention constitutes a double diffraction grating having gratings formed on front and rear faces of a transparent plane-parallel plate. The respective parameters such as the grating pitches, the distance from an emitting side grating to a light-receiving face are set to satisfy a predetermined condition. Accordingly, it is possible to provide small angular dispersion with respect to wavelength and consist high diffraction efficiency and low angular dispersion with each other. Therefore, the moving amount of a diffracted light spot on the light-receiving face with respect to the change in wavelength can be set to be small so that the diffraction grating can be used without any problem even when there is a problem about an increase in angle of diffraction.

Many widely different embodiments of the present invention may be constructed without departing from the spirit and scope of the present invention. It should be understood that the present invention is not limited to the specific embodiments described in the specification, except as defined in the appended claims.

What is claimed is:

1. A diffraction grating comprising:
   incident and emitting side gratings respectively formed on front and rear faces of a diffraction substrate composed of a transparent plane-parallel plate; and
   a pitch $\Lambda_1$ of the incident side grating, a pitch $\Lambda_2$ of the emitting side grating, a refractive index $n_1$ of the diffraction substrate, a thickness t of the diffraction substrate, an incident angle $\theta_1$ of light incident to the incident side grating, an angle $\theta_2$ of diffraction within the diffraction substrate, an emission angle $\theta_3$ of light emitted from the emitting side grating, a distance T from the emitting side grating to a face for receiving the emitted and diffracted light, and a wavelength $\lambda$ of the light being set to satisfy the following conditions, $$\frac{t}{n_1 \Lambda_1 \cos^3 \theta_2} - \frac{T}{\frac{\Lambda_1 \Lambda_2}{\Lambda_2 - \Lambda_1} \cos^3 \theta_3} < 20 \ \mu m/nm$$

$$\sin \theta_1 + n_1 \sin \theta_2 = \frac{\lambda}{\Lambda_1}$$

and $$\sin \theta_1 - \sin \theta_3 = \lambda \left( \frac{1}{\Lambda_1} - \frac{1}{\Lambda_2} \right).$$

2. A diffraction grating as claimed in claim 1, wherein the moving amount of a diffracted light spot reaching the light-receiving face is inversely proportional to resolution of the diffraction grating.

3. A diffraction grating as claimed in claim 2, wherein the moving amount of the diffracted light spot can be changed by changing the grating pitches $\Lambda_1$ and $\Lambda_2$, the thickness t, the distance T and the refractive index $n_1$.

* * * * *